United States Patent
Vangelov et al.

(10) Patent No.: US 10,744,937 B2
(45) Date of Patent: Aug. 18, 2020

(54) AUTOMATED VEHICLE SOFTWARE UPDATE FEEDBACK SYSTEM

(71) Applicant: FORD GLOBAL TECHNOLOGIES, LLC, Dearborn, MI (US)

(72) Inventors: John Naum Vangelov, South Lyon, MI (US); Brunilda Bleta Caushi, Northville, MI (US); Jason Michael Miller, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 15/871,744

(22) Filed: Jan. 15, 2018

(65) Prior Publication Data

US 2019/0217777 A1    Jul. 18, 2019

(51) Int. Cl.
| | |
|---|---|
| *B60Q 9/00* | (2006.01) |
| *G06F 11/07* | (2006.01) |
| *B60Q 1/50* | (2006.01) |
| *B60Q 5/00* | (2006.01) |
| *B60R 16/023* | (2006.01) |
| *G06F 8/65* | (2018.01) |

(52) U.S. Cl.
CPC ............... *B60Q 9/00* (2013.01); *B60Q 1/50* (2013.01); *B60Q 5/005* (2013.01); *B60R 16/0231* (2013.01); *G06F 11/07* (2013.01); *G06F 8/65* (2013.01)

(58) Field of Classification Search
CPC .. B60Q 9/00; B60Q 1/50; B60Q 5/005; B60R 16/0231; G06F 11/07
USPC .......................................................... 701/49
See application file for complete search history.

(56) References Cited

U.S. PATENT DOCUMENTS

| | | | |
|---|---|---|---|
| 9,524,160 B2 | 12/2016 | Takahashi et al. | |
| 9,529,584 B2 | 12/2016 | Eling | |
| 9,648,023 B2* | 5/2017 | Hoffman | ............... H04L 63/102 |
| 2007/0185624 A1 | 8/2007 | Duddles et al. | |
| 2010/0222939 A1* | 9/2010 | Namburu | ............... B60R 16/037 |
| | | | 701/2 |
| 2011/0270417 A1* | 11/2011 | Araki | ................. G05B 19/0421 |
| | | | 700/3 |

(Continued)

*Primary Examiner* — Krishnan Ramesh
(74) *Attorney, Agent, or Firm* — Michael Spenner; Brooks Kushman PC

(57) ABSTRACT

A vehicle includes onboard controller(s) that initiate an automated feedback mode responsive to software updates to vehicle controller(s), and which generate a trigger signal upon detecting update status inquiry conditions and feedback concluded conditions. The trigger signal causes communication of a feedback update status identifying success or failure of the software update, and terminates the feedback mode upon detecting feedback concluded conditions. The update status inquiry conditions include, for example, one or more of a vehicle door handle actuation, receiving a wireless remote keyfob signal, receiving a wireless software update status inquiry, detecting an instrument cluster switch actuation, and other update status inquiry conditions. The trigger signal causes, for further examples, communication of one or more audiovisual and tactile feedback update statuses, which identify success or failure of the software update with one or more of vehicle lighting signals and display messages, and electromechanical actuation of various vehicle components.

9 Claims, 2 Drawing Sheets

(56) References Cited

U.S. PATENT DOCUMENTS

| | | | |
|---|---|---|---|
| 2013/0245884 A1* | 9/2013 | Forutanpour | G01S 19/51 |
| | | | 701/36 |
| 2015/0169311 A1* | 6/2015 | Dickerson | G06F 8/65 |
| | | | 717/170 |
| 2015/0277942 A1* | 10/2015 | Rork | G06F 8/65 |
| | | | 701/31.4 |
| 2015/0339114 A1* | 11/2015 | Rockwell | G06F 21/57 |
| | | | 701/1 |
| 2016/0266886 A1 | 9/2016 | Sarkar et al. | |
| 2016/0294605 A1* | 10/2016 | Searle | H04L 41/082 |
| 2016/0294614 A1* | 10/2016 | Searle | G06F 8/654 |
| 2017/0331795 A1* | 11/2017 | Martin | H04W 12/02 |
| 2018/0048473 A1* | 2/2018 | Miller | G06F 8/65 |
| 2018/0074811 A1* | 3/2018 | Kiyama | H04L 67/10 |
| 2018/0336026 A1* | 11/2018 | Park | H04L 67/34 |
| 2018/0341476 A1* | 11/2018 | Kitao | H04L 67/34 |
| 2019/0108010 A1* | 4/2019 | Tillman | G07C 5/008 |
| 2019/0205115 A1* | 7/2019 | Gomes | G06F 8/65 |
| 2019/0294783 A1* | 9/2019 | Ujiie | B60R 16/0231 |

* cited by examiner

US 10,744,937 B2

AUTOMATED VEHICLE SOFTWARE UPDATE FEEDBACK SYSTEM

TECHNICAL FIELD

The disclosure relates to vehicles configured with automated software update confirmation feedback systems.

BACKGROUND

Vehicle manufacturers have developed various types of in-vehicle and/or onboard computer processing systems that sometimes require software updates. In the past, such software updates required manual operation of in-vehicle computer processing systems by a trained technician, and utilizing specialized equipment, to enable software updates to be uploaded to various controllers in the vehicle. Further, such prior technology software update capabilities also required trained technicians and special equipment to confirm such updates were completed corrected. Even with the introduction of certain types of wireless software update capabilities, such technicians continued having to manually verify software update completion.

For example, to confirm a software update has been correctly delivered to a vehicle, vehicle controller, and/or component, a technician typically must utilize special terminal devices and authentication tokens to access vehicle computing system menus, to visually verify software versions and related information has been correctly uploaded to such controllers and/or components. In manufacturing operations, where a factory must update 100s or 1000s of vehicles parked in random locations about the factory, existing methods are time consuming and costly to audit software updates for all such vehicles. All vehicles must be updated to the most recent versions software before the vehicles are released to dealers and customers.

Presently, no communication methods exist to enable such vehicles to automatically verify and confirm software updates have been successfully uploaded to the vehicles, without manual intervention. One common method still utilized by manufacturing and assembly factories includes using labels and stickers that affixed to the vehicles as a visual cue indicating that a vehicle has been or needs to be updated. Others use other visual cues such as lifting a wiper blade or opening a vehicle door to indicate software update status.

More frequent software updates are often recommended and required in view of new advances in vehicle computer processing systems and related software, which are utilized in newer and more complex electric and hybrid electric vehicles. Consequently, the need for more automated software update, verification, and confirmation capabilities has become more pronounced.

SUMMARY

Many types of personal, commercial, and industrial vehicles, including combustion engine and hybrid, plug-in hybrid, and battery electric vehicles, hereafter collectively referred to as "HEVs" and/or "vehicles," include several types of in-vehicle computing systems, controllers, interfaces, networks, communications capabilities, and software applications. These improved technologies enable vehicle operation, as well as onboard and in-vehicle control of new and improved propulsion and electric drive systems, vehicle to vehicle and vehicle to infrastructure communications, and related communications capabilities, and control and exchange of data, including remotely initiated, in-vehicle software updates to such onboard and/or in-vehicle systems.

The disclosure is directed to improvements in such combustion engine, electric, and/or hybrid electric vehicles that are configured with automated, remote, and unattended in-vehicle processing system software update capabilities, which are also referred to by those knowledgeable in the field of technology as software flash/update capabilities. The new automated, remotely initiated and controlled, and unattended update capabilities further utilize new technology for automated software update process feedback, which can include for example but not for purposes of limitation, automatic audiovisual and tactile feedback. Such automated feedback is generated in response to inquiries that can include actuation of vehicle components and/or receiving wireless update status inquiries, among other conditions. Further, the automated feedback can be terminated upon certain conditions that can include driving a vehicle a certain distance and/or actuation of vehicle components.

The new technology of the disclosure enables vehicles having at least one and/or one or more onboard controllers that are configured to initiate an automated feedback mode in response to a software update to at least one vehicle controller, which can include the onboard controller that initiates the automated feedback mode. The onboard controller is also configured to generate a trigger signal upon detecting an update status inquiry condition, and to monitor for a feedback concluded condition, such that the automated feedback mode is terminated, upon detecting the feedback concluded condition.

The disclosure is also directed to a vehicle that includes at least one and/or one or more onboard controller(s), which are configured to generate the trigger signal to cause communication of one or more of an audible, a visual, and a tactile feedback update status, which identifies success or failure of the software update. In variations, the trigger signal includes a command that continuously annunciates one or more of the audible, visual, audiovisual, and tactile feedback update status, which identifies one or more of the success and/or failure of the software update.

In modifications, the onboard controller also generates the trigger signal to cause communication of an audible feedback update status, identifying success or failure of the software update with, for example without limitation, one or more of a vehicle horn chirp, vehicle audio system message, and other audio signals. In still adaptations, the trigger signal causes communication of a visual and/or audiovisual feedback update status, identifying success or failure of the software update with one or more of a vehicle exterior lighting signal, a vehicle interior lighting signal, a vehicle visual and/or audiovisual display message, and/or other visual signals. Also contemplated is the onboard controller configured in other arrangements to generate the trigger signal to cause communication of a tactile feedback update status, which identifies success or failure of the software update with one or more electromechanical actuations of a vehicle window, a door lock, a trunk latch release, and/or other vehicle components.

The innovations of the disclosure also include the onboard controller configured to generate the trigger signal in response to detecting the update status inquiry condition, which includes one or more of a vehicle door handle actuation, a wireless remote keyfob signal, a wireless software update status inquiry, an instrument cluster switch actuation, and other update status inquiry conditions. Other variations include the onboard controller further configured to monitor for the feedback concluded condition, which includes at least one and/or one or more of detecting a vehicle trunk latch closure, a vehicle door closure, an instrument cluster switch actuation, and a vehicle key on and drive distance, as well as receiving a wireless remote keyfob signal, and an update confirmed signal, and/or detecting other feedback concluded conditions.

The disclosure also includes arrangements where the onboard controller is configured to receive and store one or more and/or at least one of: a selected update status inquiry condition, such that the trigger signal is generated in response the selected update status inquiry condition, and/or a selected feedback concluded condition, such that the feedback mode is terminated upon detecting the selected feedback concluded condition.

This summary of the implementations and configurations of the vehicles and described components and systems introduces a selection of exemplary implementations, configurations, and arrangements, in a simplified and less technically detailed arrangement, and such are further described in more detail below in the detailed description in connection with the accompanying illustrations and drawings, and the claims that follow.

This summary is not intended to identify key features or essential features of the claimed technology, and it is not intended to be used as an aid in determining the scope of the claimed subject matter. The features, functions, capabilities, and advantages discussed here may be achieved independently in various example implementations or may be combined in yet other example implementations, as further described elsewhere herein, and which may also be understood by those skilled and knowledgeable in the relevant fields of technology, with reference to the following description and drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As those of ordinary skill in the art should understand, various features, components, and processes illustrated and described with reference to any one of the figures may be combined with features, components, and processes illustrated in one or more other figures to enable embodiments that should be apparent to those skilled in the art, but which may not be explicitly illustrated or described. The combinations of features illustrated are representative embodiments for typical applications. Various combinations and modifications of the features consistent with the teachings of this disclosure, however, could be desired for particular applications or implementations, and should be readily within the knowledge, skill, and ability of those working in the relevant fields of technology.

Figure 1:
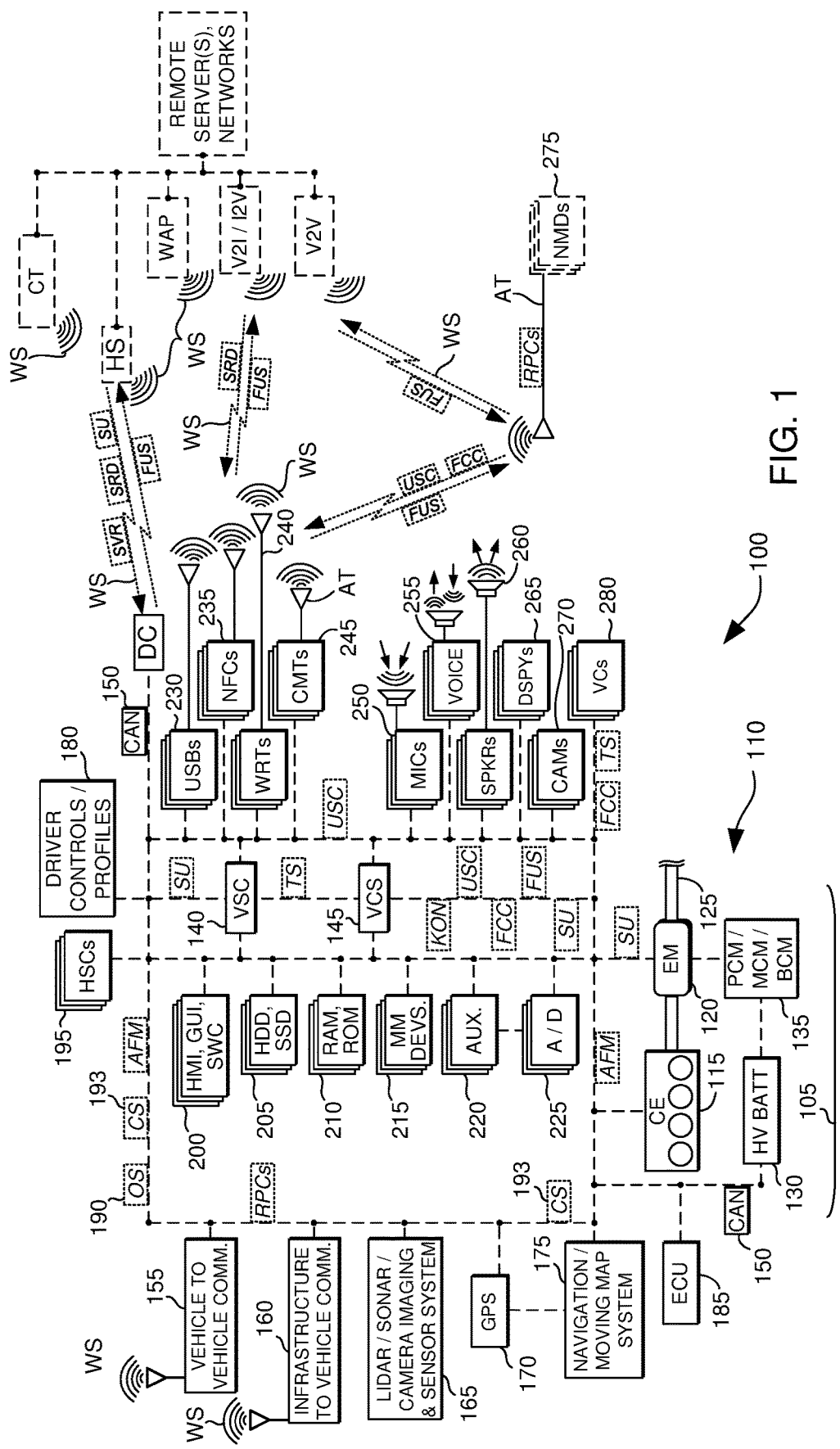
FIG. 1 is an illustration of a vehicle and its systems, controllers, components, sensors, actuators, and methods of operation.
Figure 2:
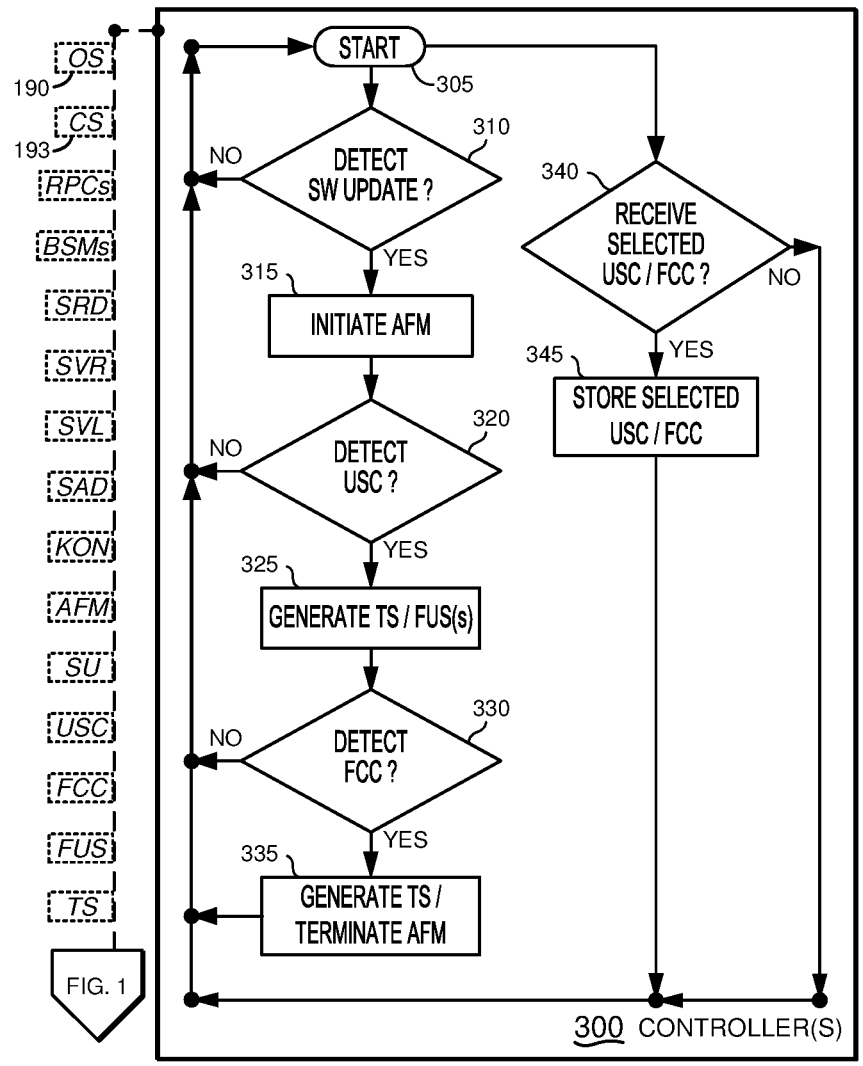
FIG. 2 illustrates certain aspects of the disclosure depicted in FIG. 1, with components removed, added, and/or rearranged for purposes of illustration.

With reference now to the various figures and illustrations and to FIGS. 1 and 2, and specifically to FIG. 1, a schematic diagram of a conventional petrochemical-powered combustion engine and/or hybrid electric vehicle 100 is shown, which vehicles may in further examples also include a battery electric vehicle, a plug-in hybrid electric vehicle, and combinations and modifications thereof, which are herein collectively referred to as an "HEV," a "vehicle," and/or "vehicles." FIG. 1 illustrates representative relationships among components of vehicle 100. Physical placement and orientation, and functional and logical connections and interrelationships of the components within vehicle 100 may vary. Vehicle 100 includes a driveline 105 that has a powertrain 110, which includes one or more of a combustion engine (CE) 115 and an electric machine or electric motor/generator/starter (EM) 120, which generate power and torque to propel vehicle 100.

Engine or CE 115 is a gasoline, diesel, biofuel, natural gas, or alternative fuel powered combustion engine, which generates an output torque in addition to other forms of electrical, cooling, heating, vacuum, pressure, and hydraulic power by way of front end engine accessory devices. EM 120 may be any one of a plurality of types of electric machines, and for example may be a permanent magnet synchronous motor, electrical power generator, and engine starter 120. CE 115 and EM 120 are configured to propel vehicle 100 via a drive shaft 125 and in cooperation with various related components that may also further include a transmission, clutch(es), differentials, a braking system, wheels, and the like.

Powertrain 110 and/or driveline 105 further include one or more batteries 130. One or more such batteries can be a higher voltage, direct current battery or batteries 130 operating in ranges between about 48 to 600 volts, and sometimes between about 140 and 300 volts or more or less, which is/are used to store and supply power for EM 120 and during regenerative braking for capturing and storing energy, and for powering and storing energy from other vehicle components and accessories. Other batteries can be a low voltage, direct current battery(ies) 130 operating in the range of between about 6 and 24 volts or more or less, which is/are used to store and supply power for other vehicle components and accessories.

A battery or batteries 130, are respectively coupled to engine 115, EM 120, and vehicle 100, as depicted in FIG. 1, through various mechanical and electrical interfaces and vehicle controllers, as described elsewhere herein. High voltage EM battery 130 is also coupled to EM 120 by one or more of a power train control module (PCM), a motor control module (MCM), a battery control module (BCM), and/or power electronics 135, which are configured to convert and condition direct current (DC) power provided by high voltage (HV) battery 130 for EM 120.

PCM/MCM/BCM/power electronics 135 are also configured to condition, invert, and transform DC battery power into three phase alternating current (AC) as is typically required to power electric machine or EM 120. PCM/MCM/BCM 135/power electronics is also configured to charge one or more batteries 130, with energy generated by EM 120 and/or front end accessory drive components, and to receive, store, and supply power from and to other vehicle components as needed.

With continued reference to FIG. 1, vehicle 100 further includes one or more controllers and computing modules and systems, in addition to PCM/MCM/BCM/power electronics 135, which enable a variety of vehicle capabilities. For example, vehicle 100 may incorporate BCM 135 to be a stand-alone unit and/or that may be incorporated as part of a vehicle system controller (VSC) 140 and a vehicle computing system (VCS) and controller 145, which are in communication with PCM/MCM/BCM 135, and other controllers. For example, in some configurations for purposes of example but not limitation, VSC 140 and/or VCS 145 is and/or incorporates the SYNC™, APPLINK™, MyFord Touch™ and/or open source SmartDeviceLink and/or OpenXC onboard and offboard vehicle computing systems, in-vehicle connectivity, infotainment, and communications system and application programming interfaces (APIs), for communication and control of and/or with offboard and/or external devices.

For further examples, but not for purposes of limitation, at least one of and/or one or more of the controller(s) such as VSC 140 and VCS 145, may incorporate and further be and/or include one or more accessory protocol interface modules (APIMs) and/or an integral or separate head unit, which may be, include, and/or incorporate an information and entertainment system (also referred to as an infotainment system and/or an audio/visual control module or ACM/AVCM). Such modules include and/or may include a media player (MP3, Blu-Ray™, DVD, CD, cassette tape, etc.), stereo, FM/AM/satellite radio receiver, and the like, as well as a human machine interface (HMI) and/or display unit as described elsewhere herein.

Such contemplated components and systems are available from various sources, and are for purposes of example manufactured by and/or available from the SmartDeviceLink Consortium, the OpenXC project, the Ford Motor Company, and others (See, for example, SmartDeviceLink.com, openXCplatform.com, www.ford.com, U.S. Pat. Nos. 9,080,668, 9,042,824, 9,092,309, 9,141,583, 9,141,583, 9,680,934, and others).

In further examples, SmartLinkDevice (SDL), OpenXC, and SYNC™ AppLink™ are each examples that enable at least one of and/or one or more of the controller(s) such as VSC 140 and VCS 145, to communicate remote procedure calls (RPCs) utilizing application programming interfaces (APIs) that enable command and control of external or off-board mobile devices and applications, by utilizing in-vehicle or onboard HMIs, such as graphical user interfaces (GUIs) and other input and output devices, which also include the hardware and software controls, buttons, and/or switches, as well as steering wheel controls and buttons (SWCs), instrument cluster and panel hardware and software buttons and switches, among other controls. Exemplary systems such as SDL, OpenXC, and/or AppLink™ enable functionality of the mobile device to be available and enabled utilizing the HMI of vehicle 100 such as SWCs and GUIs, and also may include utilization of onboard or in-vehicle automated recognition and processing of voice commands.

Controller(s) of vehicle 100 such as VSC 140 and VCS 145, include and are coupled with one or more high speed, medium speed, and low speed vehicle networks, that include among others, a multiplexed, broadcast controller area network (CAN) 150, and a larger vehicle control system and other vehicle networks that may and/or may not require a host processor, controller, and/or server, and which may further include for additional examples, other micro-processor-based controllers as described elsewhere herein. CAN 150 may also include network controllers and routers, in addition to communications links between controllers, sensors, actuators, routers, in-vehicle systems and components, and off-board systems and components external to vehicle 100.

Such CANs 150 are known to those skilled in the technology and are described in more detail by various industry standards, which include for example, among others, Society of Automotive Engineers International™ (SAE) J1939, entitled "Serial Control and Communications Heavy Duty Vehicle Network", and available from standards.sae.org, as well as, car informatics standards available from International Standards Organization (ISO) 11898, entitled "Road vehicles—Controller area network (CAN)," and ISO 11519, entitled "Road vehicles—Low-speed serial data communication,", available from www.iso.org/ics/43.040.15/x/.

CAN 150 contemplates the vehicle 100 having one, two, three, or more such networks running at varying low, medium, and high speeds that for example nay range from about 50 kilobits per second (Kbps) to about 500 Kbps or higher. CAN 150 may also include, incorporate, and/or be coupled to and in communication with internal, onboard and external wired and wireless personal area networks (PANs), local area networks (LANs), vehicle area networks (VANs), wide area networks (WANs), peer to peer (P2P), vehicle to vehicle (V2V), and vehicle to infrastructure and infrastructure to vehicle (V2I, I2V) networks, among others and as described and contemplated elsewhere herein.

In further examples without limitation, VSC 140, VCS 145, and/or other controllers, devices, and processors, may include, be coupled to, be configured with, and/or cooperate with one or more integrally included, embedded, and/or independently arranged bidirectional communications, navigation, and other systems, controllers, and/or sensors, such as a vehicle to vehicle communications system (V2V) 155, and vehicle to roadway infrastructure to vehicle communication system (V2I, I2V) 160, a LIDAR/SONAR (light and/or sound detection and ranging) and/or video camera roadway proximity imaging and obstacle sensor system 165, a GPS or global positioning system 170, and a navigation and moving map display and sensor system 175, among others.

VCS 145 can cooperate in parallel, in series, and distributively with VSC 140 and such steering wheel controls and buttons and other controllers, subsystems, and internal and external systems to manage and control vehicle 100, external devices, and such other controllers, and/or actuators, in response to sensor and communication signals, data, parameters, and other information identified, established by, communicated to, and received from these vehicle systems, controllers, and components, as well as other off-board systems that are external and/or remote to vehicle 100.

Such bidirectional V2V 155 and V2I 160 (sometimes also referred to herein collectively as V2X) communications controllers and systems enable peer to peer, vehicle to vehicle, and vehicle to infrastructure ad hoc and similar types of networks and communications, utilizing various industry protocols, standards, and/or messaging formats that available in the United States and other countries. Such protocols, standards, and/or messaging formats are utilized for purposes of enabling various aspects of the disclosure and are known to those having knowledge in the relevant technology.

A number of international standards organizations are also involved in the field of technology and have generated various V2X resources such as the Society of Automotive Engineers International™ (SAE) telematics and related standards include for example SAE standard J2735: entitled "Dedicated Short Range Communications (DSRC) Message Set Dictionary Standard," SAE J2735_201603, available from standards.sae.org/j2735_201603, and others available from topics.sae.org/telematics/standards/automotive. The communications and messaging capabilities for V2X and other applications are defined in, among other references, SAE J2735 as the Basic Safety Message(s) (BSMs, BSM-II) parts 1 and 2.

The disclosure recites BSM and BSM-II messaging capabilities interchangeably and contemplates that extended data and information capabilities enabled by the BSM-II standards are referred to in every instance herein where BSM is recited. The SAE 2735 BSM capabilities support and enable wireless communication between vehicles and/or between vehicles (V2V) and with fixed or nomadic devices, including roadway, intersection, and other infrastructure devices and systems (V2I). The SAE J2735 standard describes, defines, and specifies messages and data elements that make up messages/dialogs specifically for use by vehicle, infrastructure, and other off-board applications that utilize 5.9 gigahertz (GHz) DSRC for Wireless Access in Vehicular Environments (WAVE) communications systems.

The SAE J2945 standard describes communication performance requirements of the DSRC Message sets and the BSM data elements that support V2V and V2I safety applications. Such WAVE communications and related systems are described in more detail in various standards and reports established by and available from the Institute of Electrical and Electronics Engineers (IEEE) as described below. See, for example, standards.ieee.org, and more specifically, IEEE standard 1609, entitled, "Guide for Wireless Access in Vehicular Environments (WAVE) Architecture," which is available from standards.ieee.org/develop/wg/1609_WG.html.

In one example, IEEE 1609 WAVE standards enable and define an architecture and a standardized set of communications services and interfaces that enable secure V2V and V2I wireless communications. These standards enable a range of transportation and navigation applications, including vehicle safety, automated tolling, enhanced navigation, and traffic management, among others. The IEEE 1609 Wave capabilities are utilized in conjunction with others directed to various aspects of network and communications standards and architectures, including those managed by the IEEE 802 local area network and metropolitan area network (LAN/MAN) standards committee, which can be found at www.ieee802.org, as well as standards.ieee.org.

In another example, IEEE Standards 802.11 support software and firmware communications services of IEEE 1609, and enable data link media access control (MAC) and physical layer (PHY) capabilities, such as wireless local area network (WLAN) data communications in various frequency bands. The 802.11 standard is entitled "IEEE Standard for Information technology—Telecommunications and information exchange between systems—Local and metropolitan area networks—Specific requirements Part 11: Wireless LAN Medium Access Control (MAC) and Physical Layer (PHY) Specifications," and is available at ieeexplore.ieee.org/document/7792308.

While illustrated here for purposes of example, as discrete, individual controllers, PCM/MCM/BCM 135, VSC 140 and VCS 145, and the other contemplated controllers, subsystems, and systems, may control, be controlled by, communicate signals to and from, and exchange data with other controllers, and other sensors, actuators, signals, and components, which are part of the larger vehicle and control systems, external control systems, and internal and external networks, components, subsystems, and systems.

The capabilities and configurations described in connection with any specific micro-processor-based controller as contemplated herein may also be embodied in one or more other controllers and distributed across more than one controller such that multiple controllers can individually, collaboratively, in combination, and cooperatively enable any such capability and configuration. Accordingly, recitation of "a controller" or "the controller(s)" is intended to refer to such controllers, components, subsystems, and systems, both in the singular and plural connotations, and individually, collectively, and in various suitable cooperative and distributed combinations.

Further, communications over CAN 150 and other internal and external PANs, LANs, and/or WANs, are intended to include responding to, sharing, transmitting, and receiving of commands, signals, data, embedding data in signals, control logic, and information between controllers, and sensors, actuators, controls, and vehicle systems and components. The controllers communicate with one or more controller-based input/output (I/O) interfaces that may be implemented as single integrated interfaces enabling communication of raw data and signals, and/or signal conditioning, processing, and/or conversion, short-circuit protection, circuit isolation, and similar capabilities. Alternatively, one or more dedicated hardware or firmware devices, controllers, and systems on a chip may be used to precondition and preprocess particular signals during communications, and before and after such are communicated.

In further illustrations, PCM/MCM/BCM 135, VSC 140, VCS 145, CAN 150, and other controllers, may include one or more microprocessors or central processing units (CPU) in communication with various types of computer readable storage devices or media. Computer readable storage devices or media may include volatile and nonvolatile storage in read-only memory (ROM), random-access memory (RAM), and non-volatile or keep-alive memory (NVRAM or KAM). NVRAM or KAM is a persistent or non-volatile memory that may be used to store various commands, executable control logic and instructions and code, data, constants, parameters, and variables needed for operating the vehicle and systems, while the vehicle and systems and the controllers and CPUs are unpowered or powered off.

Computer-readable storage devices or media may be implemented using any of a number of known persistent and non-persistent memory devices such as PROMs (programmable read-only memory), EPROMs (electrically PROM), EEPROMs (electrically erasable PROM), hard disk drives (HDDs), solid state drives (SSDs), flash memory, or any other electric, magnetic, optical, or combination memory devices capable of storing and communicating data.

Each of such devices, components, processors, microprocessors, controllers, microcontrollers, memories, storage devices, and/or media may also further contain, include, and/or be embedded with one or more basic input and output systems (BIOSs), operating systems, application programming interfaces (APIs) having, enabling, and/or implementing remote procedure call (RPCs), and related firmware, microcode, software, logic instructions, commands, and the like, which enable programming, customization, coding, and configuration, and which may be embedded and/or contained in at least one of and/or distributed across one or more such devices, among other capabilities.

In this arrangement, VSC 140 and VCS 145 cooperatively manage and control the vehicle components and other controllers, sensors, and actuators, including for example without limitation, PCM/MCM/BCM 135, an engine control unit (ECU) 185, and/or various others. For example, the controllers may establish bidirectional communications with such internal and external sources, and communicate control commands, logic, and instructions and code, data, information, and signals to and/or from engine 115, EM 120, batteries 130, ECU 185, and PCM/MCM/BCM/power electronics 135, and other internal and external components, devices, subsystems, and systems. The controllers also may control and communicate with other vehicle components known to those skilled in the art, even though not shown in the figures.

The embodiments of vehicle 100 in FIG. 1 also depict exemplary sensors and actuators in communication with wired and/or wireless vehicle networks and CAN 150 (PANs, LANs) that can bidirectionally transmit and receive data, commands, and/or signals to and from VSC 140, VCS 145, and other controllers. Such control commands, logic, and instructions and code, data, information, signals, settings, and parameters, including driver preferred settings and preferences, may be captured and stored in, and communicated from a repository of driver controls, preferences, and profiles of repository 180, as well as memory and data storage of the other controller(s).

As described and illustrated in the various figures, including FIGS. 1 and 2, the signals and data, including for example, commands, information, settings, parameters, control logic and executable instructions, and other signals and data, can also include other signals (OS) 190, and control or command signals (CS) 193 received from and sent to and between controllers and vehicle components and systems, either over wired and/or wireless data and signaling connections. OS 190, and CS 193, and other signals, related control logic and executable instructions, parameters, and data can and/or may be predicted, generated, established, received, communicated, to, from, and between any of the vehicle controllers, sensors, actuators, components, and internal, external, and remote systems.

Any and/or all of these signals can be raw analog or digital signals and data, or preconditioned, preprocessed, combination, and/or derivative data and signals generated in response to other signals, and may encode, embed, represent, and be represented by voltages, currents, capacitances, inductances, impedances, and digital data representations thereof, as well as digital information that encodes, embeds, and/or otherwise represents such signals, data, and analog, digital, and multimedia information.

The communication and operation of the described signals, commands, control instructions and logic, and data and information by the various contemplated controllers, sensors, actuators, and other vehicle components, may be represented schematically as shown in FIG. 1 and other figures, and by schematically represented data communication lines and signals and wireless signals and data connections. Such diagrams illustrate exemplary commands and control processes, control logic and instructions, and operation strategies, which may be implemented using one or more computing, communication, and processing techniques that can include real-time, event-driven, interrupt-driven, multi-tasking, multi-threading, and combinations thereof.

The steps and functions shown may be executed, communicated, and performed in the sequence depicted, and in parallel, in repetition, in modified sequences, and in some cases may be combined with other processes and/or omitted. The commands, control logic, and instructions may be executed in one or more of the described microprocessor-based controllers, in external controllers and systems, and may be embodied as primarily hardware, software, virtualized hardware, firmware, virtualized hardware/software/firmware, and combinations thereof.

FIG. 1 also schematically depicts for continuing illustration purposes but not for purposes of limitation, an example configuration and block topology for VCS 145 for vehicle 100 and its contemplated controllers, devices, components, subsystems, and/or systems. The disclosure is directed to the HMIs including the hardware and software switches and controls (HSCs) 195, which further refer to, incorporate, and include buttons, and/or switches, and steering wheel controls and buttons (SWCs), instrument cluster and panel hardware and software buttons and switches, and GUI display software switches and controls, among other controls In additional exemplary arrangements, the various controllers, such as for example VCS 145, include(s) and/or may include in some arrangements, at least one and/or one or more human machine interfaces (HMIs)/graphical user interface(s) and visual display(s) (GUIs, HMIs) 200 that may be located in a cabin of vehicle 100. HMIs/GUIs 200 may also be coupled and cooperate with automated speech recognition and speech synthesis subsystems, as well as with additional hardware and software controls, buttons, and/or switches HSCs 195, which are incorporated, included, and/or displayed on, about, and/or as part of HMI/GUI 200 and instrument clusters and panels of vehicle 100.

Such controls, buttons, and/or switches may be integrated with HMIs/GUIs 200, as well as with other vehicle devices and systems that may include, for further examples and illustrations, a steering wheel and related components, vehicle dashboard panels and instrument clusters, and the like. For added purposes of example without limitation, VCS 145 may include and/or incorporate persistent memory and/or storage HDDs, SSDs, ROMs 205, and non-persistent or persistent RAM/NVRAM/EPROM 210, and/or similarly configured persistent and non-persistent memory and storage components.

VCS 145 and/or other controller(s), in illustrative but non-limiting examples, also include, incorporate, and/or are coupled to one or more vehicle-based bidirectional data input, output, and/or communications and related devices and components, which enable communication with users, drivers, and occupants of vehicle 100, as well as with external proximate and remote devices, networks (CAN 150, PANs, LANs, WANs), and/or systems. The phrases "in-vehicle," "vehicle-based," and "onboard" refer to devices, subsystems, systems, and components integrated into, incorporated about, coupled to, and/or carried within vehicle 100 and its various controllers, subsystems, systems, devices, and/or components. In contrast, the phrase "offboard" is directed and contemplates such controllers, subsystems, systems, devices, and/or components being located external to and/or remote from vehicle 100.

For additional examples, VCS 145, GUIs 200, and other controllers of vehicle 100, may include, incorporate, be paired to, synchronized with, and/or be coupled with vehicle-based multimedia devices 215, auxiliary input(s) 220 and analog/digital (A/D) circuits 225, universal serial bus port(s) (USBs) 230, near field communication transceivers (NFCs) 235, wireless routers and/or transceivers (WRTs) 240, such as "Bluetooth™" devices, that enable wireless personal and local area networks (WPANs, WLANs) or "WiFi" IEEE 802.11 and 803.11 communications standards.

The controller(s) and devices(s) of vehicle 100 are also coupled with, incorporate, and/or include analog and digital cellular network modems and transceivers (CMTs) 245 utilizing voice/audio and data encoding and technologies that include for example, those managed by the International Telecommunications Union (ITU) as International Mobile Telecommunications (IMT) standards, which are often referred to as global system for mobile communications (GSM), enhanced data rates for GSM evolution (EDGE), universal mobile telecommunications system (UMTS), 2G, 3G, 4G, 5G, long-term evolution (LTE), code, space, frequency, polarization, and/or time division multiple access encoding (CDMA, SDMA, FDMA, PDMA, TDMA), and similar and related protocols, encodings, technologies, networks, and services.

Such contemplated onboard and offboard devices and components, among others, are configured to enable bidirectional wired and wireless communications between components and systems of vehicle 100, CAN 150, and other external devices and systems and PANs, LANs, and WANs. A/D circuit(s) 225 is/are configured to enable analog-to-digital and digital-to-analog signal conversions. Auxiliary inputs 220 and USBs 230, among other devices and components, may also enable in some configurations wired and wireless Ethernet, onboard diagnostic (OBD, OBD II), free-space optical communication such as Infrared (IR) Data Association (IrDA) and non-standardized consumer IR data communication protocols, IEEE 1394 (FireWire™ (Apple Corp.), LINK™ (Sony), Lynx™ (Texas Instruments)), EIA (Electronics Industry Association) serial protocols, IEEE 1284 (Centronics Port protocols), S/PDIF (Sony/Philips Digital Interconnect Format), and USB-IF (USB Implementers Forum), and similar data protocols, signaling, and communications capabilities.

Auxiliary inputs 220 and A/D circuits 225, USBs 230, NFCs 235, WRTs 240, and/or CMTs 245, is/are coupled with, integrated with, and/or may incorporate integral amplifier, signal conversion, and/or signal modulation circuits, which are configured to attenuate, convert, amplify, and/or communicate signals, and which are further configured to receive various analog and/or digital input signals, data, and/or information that is processed and adjusted and communicated to and between the various wired and wireless networks and controllers.

Such wired and wireless contemplated networks and controllers include, for example but not limitation, CAN 150, VCS 145, and other controllers and networks of vehicle 100. Auxiliary inputs 220, A/D circuits 225, USBs 230, NFCs 235, WRTs 240, and/or CMTs 245, and related hardware, software, and/or circuitry are compatible and configured to receive, transmit, and/or communicate at least one of and/or one or more of a variety of wired and wireless signals, signaling, data communications, and/or data streams (WS), and data such as navigation, audio and/or visual, and/or multimedia signals, commands, control logic, instructions, information, software, programming, and similar and related data and forms of information.

Additionally, one or more input and output data communication, audio, and/or visual devices are contemplated to be integrated with, coupled to, and/or connectable to, auxiliary inputs 220, A/D circuits 225, USBs 230, NFCs 235, WRTs 240, and/or CMTs 245, as well as to the other contemplated controller(s) and wired and wireless networks internal to vehicle 100, and in some circumstances external to vehicle 100. For example, the one or more input and output devices include microphones 250, voice processing and recognition devices and subsystems 255, speaker(s) 260, additional display(s) 265, camera(s) 270, nomadic and mobile devices (NMDs) 275, among others, which each include at least one and/or one or more integrated signaling and communications antennas and/or transceivers (AT).

Such input and output devices are and/or may be selectable, connectable, synchronized with, paired to, and/or actuatable with an input selector that may be any of HSCs 195, HMIs/SWCs 200, and may also include, incorporate, and/or be integrated with and/or as part of GUI 200 and the contemplated hardware and software SWCs, controls, buttons, and/or switches 195, 200. Such HSCs 195, as already noted, may be hardware or software or combinations thereof and may be configurable utilizing one or more predetermined, default, and adjustable factory and/or driver controls, profiles, and/or preferences 180.

The contemplated microphones 250, voice processing and recognition devices and subsystems 255, speaker(s) 260, additional display(s) 265, camera(s) 270, NMDs 275, and/or other portable auxiliary devices, may further include for example but not limitation, cell phones, mobile phones, smart phones, satellite phones and modems and communications devices, tablets, personal digital assistants, personal media players, key fob security and data storage devices, personal health devices, laptops, portable wireless cameras, headsets and headphones that may include microphones, wired and wireless microphones, portable NFC speakers and stereo devices and players, portable GPS devices, and similar devices and components that each may include integrated transceivers and antennas AT, wired and plugged data connectors DC, and related components, for wired and wireless multimedia and data communications signals WS.

Such contemplated input, output, and/or communications devices, components, subsystems, and systems onboard vehicle 100 are and/or may be configured to bidirectionally communicate over wired and wireless data connections (DCs) and wired and wireless signals and signaling and data communications and streams WSs, with external near and far nomadic, portable, and/or mobile devices 275, networks, and systems (V2X) that may include, for example, infrastructure communications systems (V2I) such as hotspots and wireless access points (HS/WAPs), nano and micro and regular cellular access points and towers (CT), external routers, and related and accessible external, remote servers, networks, and/or systems.

With continuing reference to FIGS. 1 and 2, it may be understood by those with knowledge in the relevant fields of technology that the disclosure contemplates vehicle 100 to include at least one and/or one or more controller(s) such as VSC 140, VCS 145, and others coupled with an in-vehicle or onboard transceiver AT, such as those described in connection with USBs 230, NFCs 235, WRTs 240, and/or CMTs 245. Although types of wireless transceivers are described and contemplated for use by the disclosure, the disclosure also is directed vehicle communications utilizing nearby and remote legacy devices known to some having skill in the related technologies.

Such legacy devices have in recent years seen advances to include wireless configurations, and can include for further examples, what are referred to by some in the field of art as diagnostic vehicle gateway and engineering and connectivity service tools (VGs, ESTs, CSTs). The controller(s) 140, 145 and transceiver(s) AT are configured to detect WSs and connect to nearby or proximate or far wired and wireless network devices having in-range WSs, as well as third-party, off-board, external devices such as nomadic, portable, and/or mobile or nomadic mobile devices 275.

Vehicle 100 also includes the various in-vehicle and/or onboard controller(s) such as VSC 140, VCS 145, and others coupled to, in communication with, to include, and/or be configured with the variously described wired and/or wireless transceivers and network communication devices being configured to connect with and/or communicate with the remote server and/or servers (FIG. 1). The in-vehicle and/or onboard controller(s) are configured to communicate with and enable automated software updates for HEV or vehicle 100, which are received from the remote server(s) or other local update servers that may be located in and near a manufacturing and assembly factory or plant, via wireless and/or wired connections with such local and remote servers.

Various software update capabilities are utilized by the HEV 100 of the disclosure, including the messaging and data communications capabilities and the contemplated BSMs, described elsewhere herein, including message formats compatible for use with OBD II messaging formats such as ePIDs (electronic parameter identifiers), as well as V2I and I2V open source messaging formats configured for use with and implemented by various original equipment manufacturers (OEMs), such as for purposes of example but not for purposes of limitation, SmartLinkDevice (SDL), OpenXC, and SYNC™ AppLink™, among others. Examples of such software update related data elements and/or metadata, include for example purposes without limitation, a vehicle identification number (VIN), a software update release notification (SRD), a software version request (SVR), a software version list (SVL), a software update authentication data (SAD), and/or other elements. While described here for purposes of example, such update related data elements may be included as separate data elements and/or combined as part of a single data element, such as BSMs, OBD II compatible messages, and other types of open source and/or OEM compatible messaging formats.

In typical applications, the VIN may include only some and/or a portion of the standardized 17-digit unique vehicle identifiers issues by OEMs, and may only include the three character manufacturer identifier, the 5-character vehicle descriptor, the descriptor check digit, the year digit, and assembly plant, and may exclude the remaining 6-digit production number. This arrangement enables the software update data elements to be utilized for fleets of HEVs/vehicles 100 that may require an update, without the need for additional identification data. In other arrangements, a VIN range may be included such that each recipient vehicle, onboard controller may detect whether the software update is applicable or may be disregarded for any particular HEV or vehicle 100.

The SRD of the disclosure is configured to include update related data that an OEM may require, to enable and notify automated vehicle software update systems of a newly released update, and to enable such updates of onboard vehicle software for a particular controller(s) and/or onboard computer processing and computing system. Such SRDs may include serial numbers, hardware part numbers, manufacture dates, and similar types of data, which vehicle software update systems may require, to detect whether various vehicle controller(s) and computing systems are compatible for use with and/or require such software updates.

The SVR may enable the remote and/or local server(s) to poll each vehicle in large vehicle fleets to determine what versions of specific software are installed in individual vehicles 100 that are deployed about a factory, manufacturing, or assembly plant, or dealership, and/or which are in possession of customers and users. In one exemplary variation, SVR incorporates a request from the remote server(s) that commands vehicle 100 to reply with a list of current, installed software versions for the onboard controller(s) and computing systems.

The SVL transmitted from the remote server(s) will in one example incorporate a list of the most current software versions available on the remote server(s), which enables recipient vehicles 100 to detect whether software updates are available from remote server(s) and/or required. In another example, the SVL may be transmitted to the remote server(s) from vehicles 100, to enable the remote server(s) to detect whether the source vehicles 100 may require software updates. The SAD includes, for purposes of further examples, checksums, cryptologic keys, and related information, which enables vehicles 100 to verify error-free receipt of software updates downloaded from the remote server(s). SADs can also be configured to further enable verification of successful installation and flashing of such updates to the controller(s) and computing systems of vehicles 100. Detected errors may be recorded in profiles 180 and/or communicated to one or more of remote server(s), HMI/GUI 200 of vehicle 100, and/or NMDs 275, among others.

The in-vehicle and/or onboard controller(s) are also configured to detect whether a software update is required and/or compatible according to one or more of the SRD, SVL, and/or SAD updated related data. For required and compatible software updates identified thereby, the controller(s) of vehicle 100 are configured to also download and install a software update from the local and/or remote server(s) to vehicle 100. Once download and installation and/or flash updating of controllers, components, and/or systems is completed, in added variations of the disclosure, the controller(s) verify error free download utilizing the SAD and/or other update related data elements.

Further variations of the disclosure include the at least one and/or one or more onboard controller(s), such as VSC 140, VCS 145, and others (herein individually and/or collectively referred to as controllers 140, 145), configured to initiate and/or activate an automated feedback mode (AFM) in response to a software update (SU), which may be identified by SRD or another message, to at least one vehicle controller including the onboard controller. Many such vehicle controllers, components, systems, and subsystems are described throughout this disclosure. While AFM is active, onboard controller(s) 140, 145 generate a trigger signal (TS) upon detecting an update status inquiry condition (USC). Onboard controller(s) 140, 145 also monitor for a feedback concluded condition (FCC), and automatically terminate AFM upon detecting FCC.

For further example, if SU(s) include an updated software configuration for the onboard and/or in-vehicle controller that is tasked with performing the software updates for vehicle 100, then that onboard controller, such as controller(s) 140, 145, and/or others, may task a different onboard controller, and/or may relinquish update control temporarily and instantiate an independent process running on another onboard controller, to perform the required update, and update verification and confirmation.

In additional arrangements, the disclosure includes onboard controller(s) 140, 145, and/or others, further configured to generate TS to cause communication of one or more of an audible, a visual, an audiovisual, and a tactile feedback update status or statuses (FUSs), which identify(ies) success or failure of SU. In other variations, TS includes a command that continuously annunciates the one or more audible, visual, and tactile FUS(s) identifying success and/or failure of the SU. Onboard controller(s) 140, 145, and/or others are further configured to generate TS to cause communication of the audible FUS(s), to identify success or failure of the software update with one or more of a vehicle horn chirp, a vehicle audio system message via vehicle voice system and/or speakers 255, 260, and other audio signals.

Similarly, other adaptations of controller(s) 140, 145, and/or others, also generate TS to cause communication of the visual FUS(s), identifying success or failure of the SU with one or more of a vehicle exterior lighting signal (e.g., brake lights, headlamps, turn signals, etc.), a vehicle interior lighting signal (e.g. instrument cluster lights, interior ambient lights, console lighting, console display annunciation lights and messages, etc.), a vehicle audiovisual display message displayed about one or more vehicle displays 140, 145, 265 and/or NMDs 275, and other visual signals. The disclosure also contemplates onboard controller(s) 140, 145, and/or others, further configured to generate TS to cause communication of the tactile FUS(s), identifying success or failure of SU with one or more electromechanical actuations of various vehicle components (VCs) 280, which include for purposes of example, a vehicle window, a door lock, a trunk latch release, and other vehicle components 280.

In further variations of the disclosure, onboard controller(s) 140, 145, and/or others, of vehicle 100 are also coupled to the HSCs 195, HMI(s), and/or GUI(s) 200, and further configured to generate and communicate FUS(s) in response to USC from HSC(s) 195, HMI(s)/GUI(s) 200, and/or NMDs 275 that may be in communication with HEV/vehicle 100. Such HMI/GUI 200 based USC(s) enable a technician and/or user of HEV/vehicle 100 to detect and confirm whether SUs have been installed.

Onboard controller(s) 140, 145, and/or others are also further modified and configured to generate TS in response to detecting USC, which includes, for example without limitation, at least one and/or one or more of actuations of HSC(s) 195, HMI(s)/GUI(s)/SWC(s) 200, VCs 280, and/or receiving and/or detecting various WS and other signals. For purposes of example, but without limitation, such USCs include a vehicle door handle actuation, a wireless remote keyfob signal, a wireless software update status inquiry, an instrument cluster switch actuation, and other update status inquiry conditions.

Additional arrangements of the disclosure also include onboard controller(s) 140, 145, and/or others, configured to monitor for FCC(s), which include(s) for example, one or more and/or at least one of detecting actuation of various VCs, including a vehicle trunk latch closure, a vehicle door closure, an instrument cluster switch actuation, and a vehicle key on (KON) and drive distance. The KON state includes a vehicle ignition/propulsion/drive train electronic key state to be in a powered-on condition. Monitoring for such FCC(s) also include for further illustration purposes, receiving of various WS and other signals, such as receiving and/or detecting a wireless remote keyfob signal, and an update confirmed signal, and other feedback concluded conditions.

The variations of HEV/vehicle 100 also include onboard controller(s) 140, 145, and/or others, configured to receive and store a selected USC, such that TS is generated responsive to controller(s) 140, 145, and/or others, detecting the selected USC, such that the various FUS(s) are generated and/or communicated. In this variation, onboard controller(s) are configured to implement a factory predetermined USC and/or to enable customer selection of a preferred USC. Similarly, onboard controller(s) 140, 145, and/or others, are further configured to receive and store a selected FCC, such that TS is generated responsive to controller(s) 140, 145, and/or others, detecting the selected FCC, and such that the AFM is terminated upon detecting the selected FCC.

With continuing reference to FIG. 1, and now also to FIG. 2, those knowledgeable in the technology of the disclosure may also understand that the described arrangements, modifications, and variations also include and are directed to methods of operation, which utilize one or more of the various controllers and processing and computing systems, and other components, devices, and systems of HEV/vehicle 100 described elsewhere herein, which are now referenced generally in FIG. 2 as controller(s) 300. While various method steps are recited in FIG. 2 in a depicted order or sequence, such an illustration is for example purposes only, and should not be construed to require a certain order or sequence or other limitation.

For additional examples, a method of controlling HEV/vehicle 100 by onboard controller(s) 140, 145, and/or others here also referred to collectively and individually as controller(s) 300, starts at step 305, and includes at step 310, detecting whether a SU has been installed in a controller, component, subsystem, and/or system of HEV/vehicle 100, and if so, initiating AFM at step 315. Continuing at step 320, the method monitors for USC, and if detected, generates at step 325 the TS, such that TS causes and/or generates FUS(s) that identify success or failure of installation/flash update of SU. The method also includes at step 330, monitoring for and detecting FCCs, and if detected, at step 335 generating TS causing termination of and/or to terminate AFM. In other variations, the methods include at step 340 receiving one or more USCs and/or FCCs, and at step 345 storing the USCs and/or FCCs, to be utilized by the systems and methods of the disclosure to generate TS and the consequent FUSs and termination of AFM.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle, comprising:
a storage configured to store a plurality of update status inquiry conditions and a plurality of feedback concluded conditions; and
an onboard controller configured to:
 initiate an automated feedback mode in response to a software update to at least one vehicle controller including the onboard controller;
 responsive to detecting activation of a first update status inquiry condition, generate a success trigger signal to cause communication of at least one of an audible, a visual, and a tactile feedback update status, which identifies success of the software update, the first update status inquiry condition corresponding to a first user input to the vehicle; and
 responsive to detecting activation of a first feedback concluded condition, terminate the first feedback mode and deactivate the trigger signal, the first feedback concluded condition corresponding to a second user input to the vehicle.

2. The vehicle according to claim 1,
wherein the onboard controller is further configured to generate a failure trigger signal to include a command that continuously annunciates one or more of an audible, a visual, and a tactile feedback update status, the status identifying failure of the software update.

3. The vehicle according to claim 1,
wherein the onboard controller is further configured to generate the success trigger signal to cause communication of the audible feedback update status, the status including one or more of a vehicle horn chirp, a vehicle audio system message, and other audio signals.

4. The vehicle according to claim 1,
wherein the onboard controller is further configured to generate the success trigger signal to cause communication of a visual feedback update status, including a vehicle exterior lighting signal, a vehicle interior lighting signal, a vehicle audiovisual display message, and other visual signals.

5. The vehicle according to claim 1,
wherein the onboard controller is further configured to generate the success trigger signal to cause communication of a tactile feedback update status, including one or more electromechanical actuations of a vehicle window, a door lock, a trunk latch release, and other vehicle components.

6. The vehicle according to claim 1
wherein the first user input includes one or more of a vehicle door handle actuation, a wireless remote keyfob signal, a wireless software update status inquiry, an instrument cluster switch actuation, and other update status inquiry conditions.

7. The vehicle according to claim 1,
wherein the second user input is different from the first user input, and includes at least one of: a vehicle door handle actuation, a wireless remote keyfob signal, a wireless software update status inquiry, an instrument cluster switch actuation, and other update status inquiry conditions.

8. The vehicle according to claim 1,
wherein the onboard controller is further configured to, responsive to receiving a user selection indicative of an intent to select a second update status inquiry condition corresponding to a third user input to the vehicle, deactivate the first update status inquiry condition and activate the second update status inquiry condition.

9. The vehicle according to claim 1,
wherein the onboard controller is further configured to, responsive to receiving a user selection indicative of an intent to select a second feedback concluded condition corresponding to a fourth user input to the vehicle, deactivate the first feedback concluded condition and activate the second feedback concluded condition.

* * * * *